United States Patent [19]

Flicker et al.

[11] Patent Number: 4,873,157

[45] Date of Patent: Oct. 10, 1989

[54] RECOMBINANT ELECTRIC STORAGE BATTERY

[75] Inventors: Robert P. Flicker, Topton; Scott Fenstermacher, Kutztown, both of Pa.

[73] Assignee: East Penn Manufacturing Co., Inc., Lyon Station, Pa.

[21] Appl. No.: 214,754

[22] Filed: Jul. 5, 1988

[51] Int. Cl.$^4$ ............................................. H01M 10/06
[52] U.S. Cl. ................................. 429/57; 429/225; 429/245; 429/247; 429/142
[58] Field of Search ............... 429/142, 144, 145, 245, 429/252, 247, 57, 225

[56] References Cited

U.S. PATENT DOCUMENTS

| | | | |
|---|---|---|---|
| 3,862,861 | 1/1975 | McClelland et al. | 429/245 X |
| 3,912,537 | 10/1975 | Peters | 429/245 |
| 4,113,476 | 9/1978 | Nees et al. | 429/245 X |
| 4,166,155 | 8/1979 | Mao et al. | 429/225 X |
| 4,245,013 | 1/1981 | Clegg et al. | 429/144 |
| 4,359,511 | 11/1982 | Strezmpko | 429/252 |
| 4,367,271 | 1/1983 | Hasegawa et al. | 429/252 |
| 4,401,730 | 8/1983 | Szymborski et al. | 429/53 |

*Primary Examiner*—Anthony Skapars
*Attorney, Agent, or Firm*—Z. T. Wobensmith, III

[57] ABSTRACT

A recombinant electric storage battery which includes separators of multiple fiber electrolyte absorbency that retain a balanced amount of absorbed electrolyte, for controlled recombination and which are in contact with positive and negative plates, the negative plates being antimony free and the positive plates containing antimony in amount of 2 to 4 percent of total alloy weight, which provides considerably greater capacity and cycling life.

1 Claim, No Drawings

RECOMBINANT ELECTRIC STORAGE BATTERY

BACKGROUND OF THE INVENTION

1. Field of the Invention

This invention relates to a recombinant electric storage battery which includes separators that retain a selected balanced quantity of electrolyte and has positive plates of high antimony content.

2. Description of the Prior Art

There has been considerable interest in developing recombinant electric storage batteries due to their maintenance-free capabilities, long life, and possible manufacturing economies. Recombinant batteries of the lead acid or nickel cadmium type which operate by recombining the gases generated during charging are known in the art.

Recombinant batteries usually operate on the oxygen cycle and are designed with an excess of negative material as compared with positive material. During charging the positive electrodes reach full charge and generate oxygen before the negative electrodes generate hydrogen. The batteries are designed for optimum oxygen movement to the negative electrodes for recombination with the negative material or with the generated hydrogen to form water. By recombining the oxygen the internal pressure in the battery is restrained, the cell can be sealed and the battery continuously charged.

Examples of prior art batteries are found in the following U.S. patents: Abramson No. 3,170,819; McClelland, et al. No. 3,704,173; McClelland, et al. No. 3,862,861; Peters, et al. No. 4,119,772; Habich, et al. No. 4,320,181; Peters, et al. No. 4,373,015; McClelland, et al. No. 4,383,011; and Pearson No. 4,525,438.

The use of antimony in the positive plates in a sealed lead acid battery is described in the Szymborski, et al. Patent No. 4,401,730 as an improvement where the antimony content of the positive plates is not more than 2 percent. The Szymborski patent also describes control cells which contain antimony of a 2.1 percent content, which cells are described as showing a marked decrease in capacity after 300 cycles, compared with the cells made by Szymborski, according to his invention, that contained 1.4 to 1.5 percent antimony.

It is known that adding antimony as a component of the positive plates of a lead acid battery improves performance, but it also increases the degree of gassing of the positive plates, and no satisfactory solution has been proposed in the prior art to accommodate the higher rate of gassing.

It has been found that lead acid batteries constructed with fibrous sheet plate separators, having first and second fibers of different absorbency relative to the electrolyte in order to control the recombination rate, can control the degree of gassing that occurs with antimony levels above 2 percent of total alloy weight.

SUMMARY OF THE INVENTION

This invention relates to a recombinant electric storage battery with separators of the type that contain a balanced amount of electrolyte, and positive plates of the battery which contain antimony above 2 percent of total alloy weight. Control of the recombinant rate controls the increased gassing of the plates which provides greater current capacity.

The principal object of the invention is to provide a recombinant lead acid storage battery of increased current capacity.

A further object of the invention is to provide a battery of the character aforesaid which is economical to construct and has a long service life.

A further object of the invention is to provide a battery of the character aforesaid which can be constructed in a large number of shapes and sizes.

A further object of the invention is to provide a battery of the character aforesaid which is of reduced weight.

Other objects and advantageous features of the invention will be apparent from the description and claims.

It should, of course, be understood that the description herein is illustrative merely and that various modifications and changes can be made in the structure disclosed without departing from the spirit of the invention.

DESCRIPTION OF THE PREFERRED EMBODIMENTS

Recombinant lead acid storage batteries in accordance with the invention include an outer sealed case with provisions for venting of excess internal gas pressure, separators, positive and negative plates and electrolyte absorbed and retained in the separators. The separators are in close contact with the plates to wet the plates and to permit oxygen generated by the positive plates to travel to the negative plates for recombination with the negative active material, or with hydrogen produced by the negative plates. Since it is known that antimony added to the positive plates improves cycle life and current capacity, positive plates of a lead alloy were constructed with the following content in addition to lead of:

| % Sb | % As | % Cu | % Sn | % S | % Ca |
|------|------|------|------|------|------|
| 2.30 | 0.20 | 0.08 | 0.23 | 0.01 | |

Negative lead alloy plates were constructed with the following content in addition to lead of:

| % Sb | % As | % Cu | % Sn | % S | % Ca |
|------|------|------|------|------|------|
| <0.001 | <0.001 | <0.0005 | 0.2–0.4 | <0.001 | 0.10 |

The amount of electrolyte available in the separators must be carefully balanced since too much electrolyte reduces the gas transfer passageways in the separator, and reduces the area available for gas recombination at the negative plate surfaces in contact therewith. Too little electrolyte causes reduced battery performance due to increased resistance and insufficient sulphate ions. It is important to provide sufficient electrolyte so that the recombinant action overcomes the increased gassing caused by the higher percentage of antimony. In addition, it is important that the separators be in close contact with the plates. This objective can be obtained by improving the compression resiliency of the separators. Absorbent mat separators were fabricated of first and second fibers which are inert to a particular electrolyte to be used, the fibrous sheet separators used were constructed as disclosed in the U.S. patent application to Badger, Ser. No. 929,648, filed Nov. 12, 1986.

As described in the Badger specification: "The first fibers impart to the sheet a given absorbency greater than 90 percent relative to the particular electrolyte, when surfactant-free, while the second fibers impart to the sheet a different absorbency less than 80 percent relative to the electrolyte, when surfactant-free. The first and second fibers are present in the sheet in such proportions that the sheet has an absorbency with respect to that electrolyte, when surfactant-free, of from 75 to 95 percent. Preferably, the first fibers are glass fibers, most desirably glass fibers having an average diameter less than 5 um. In one preferred embodiment the second fibers are organic fibers that are hydrophobic relative to the electrolyte, when surfactant-free, most desirably polyethylene or polypropylene fibers. In another preferred embodiment the second fibers are coarse glass fibers, for example, having a diameter from 10 um to 20 um. In a third preferred embodiment there are both organic fibers that are hydrophobic relative to the electrolyte, when surfactant-free, and large diameter glass fibers, in addition to glass fibers having an average diameter less than 5 um."

A recombinant battery was constructed using the described badger plate and separator construction, and it was compared to a like recombinant battery constructed with an antimony content in the positive plates of 2.3 percent. The batteries constructed with 0 and 2.3% percent antimony content tested as shown in Table I.

TABLE 1

Comparison of Performance and Life of a Group 22NF Recombination Battery with 2.3% Antimony (Sb) Positive Versus 0.0% Antimony (Sb) Positive (PbCaSn Alloy)

| Test | PbCaSn* Positive/Negative | 2.3% Sb Positive** PbCaSn Negative | % Increase |
| --- | --- | --- | --- |
| 3 Hours @ 8.7 Ampere | 2.28 Hours | 3.38 Hours | 48% |
| 6 Hours @ 5.28 Ampere | 4.03 Hours | 5.41 Hours | 34% |
| 1 Hour @ 25 Ampere | 0.56 Hours | 0.79 Hours | 41% |
| 20 Hour (A.H.) | 25.43 A.H. | 35.20 A.H. | 38% |
| # Cycles B.C.I. | 100 | 143 | 43% |
| Life Cycle Test | | (Range 125–160) | |

*PbCaSn alloy typically contains .10% Ca, .25% Sn and Pb are remainder.
**2.3% Sb alloy typically contains 2.2–2.4% Sb, .10–.25% Sn and various grain refining elements.

The battery of the invention with 2.3 percent antimony provided a markedly increased capacity in contrast to the 0% antimony battery and the examples disclosed by the Szymborski, et al. patent which indicated a gratly decreased capacity with an antimony content of greater than 2.1%.

It will thus be seen that the objects of the invention have been achieved.

We claim:

1. A recombinant storage battery comprising
a plurality of positive plates containing about 2 to 4 percent of antimony based upon the total weight of the alloy and positive active material, and essentially antimony free negative plates in a closed case;
a fibrous sheet plate separator between adjacent ones of said plates, and a body of an electrolyte to which said sheet separators are inert absorbed by each of said separators and maintained in contact with each of the adjacent ones of said plates, each of said separator sheets comprising first fibers which impart to the sheet a given absorbency greater than 90 percent relative to said electrolyte and second fibers which impart to the sheet a different absorbency less than 80 percent relative to said electrolyte, the first and second fibers being present in such proportions that each of said sheet separators has an absorbency with respect to said electrolyte of from 75 to 95 percent and the second fibers being present in such proportions that the battery has a recombination rate adequate to compensate for gassing.

* * * * *